(12) United States Patent
Salam et al.

(10) Patent No.: US 8,300,523 B2
(45) Date of Patent: Oct. 30, 2012

(54) MULTI-CHASIS ETHERNET LINK AGGREGATION

(75) Inventors: Samer M. Salam, Vancouver (CA); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 12/180,934

(22) Filed: Jul. 28, 2008

(65) Prior Publication Data

US 2010/0020680 A1      Jan. 28, 2010

(51) Int. Cl.
 *G01R 31/08*    (2006.01)
(52) U.S. Cl. .......................... 370/220; 370/217
(58) Field of Classification Search ........... 370/216–228
 See application file for complete search history.

(56) References Cited

U.S. PATENT DOCUMENTS

| | | | |
|---|---|---|---|
| 5,835,696 A * | 11/1998 | Hess .............................. 714/10 |
| 6,032,194 A | 2/2000 | Gai et al. |
| 6,330,229 B1 | 12/2001 | Jain et al. |
| 6,442,133 B2 * | 8/2002 | Owada .......................... 370/219 |
| 6,513,129 B1 | 1/2003 | Tentij et al. |
| 6,535,491 B2 | 3/2003 | Gai et al. |
| 6,542,934 B1 | 4/2003 | Bader et al. |
| 6,628,661 B1 | 9/2003 | Goldman et al. |
| 6,678,241 B1 | 1/2004 | Gai et al. |
| 6,697,339 B1 | 2/2004 | Jain |
| 6,721,275 B1 | 4/2004 | Rodeheffer et al. |
| 6,801,506 B1 | 10/2004 | Dey |
| 6,891,808 B2 | 5/2005 | Ishii |
| 6,956,824 B2 | 10/2005 | Mark et al. |
| 6,987,740 B1 | 1/2006 | Di Benedetto et al. |
| 7,016,351 B1 | 3/2006 | Farinacci et al. |
| 7,197,660 B1 * | 3/2007 | Liu et al. ...................... 714/4.12 |
| 7,453,900 B2 | 11/2008 | Robinson et al. |
| 7,480,283 B1 * | 1/2009 | Sylvain ......................... 370/352 |
| 7,518,986 B1 * | 4/2009 | Chadalavada et al. ........ 370/218 |
| 7,580,349 B1 * | 8/2009 | Wang et al. ................... 370/230 |
| 2002/0112072 A1 | 8/2002 | Jain |
| 2002/0152320 A1 | 10/2002 | Lau |
| 2002/0167895 A1 * | 11/2002 | Zhu et al. ...................... 370/216 |
| 2003/0021226 A1 * | 1/2003 | Mor .............................. 370/223 |
| 2003/0161260 A1 * | 8/2003 | Murugan ....................... 370/217 |
| 2003/0179700 A1 | 9/2003 | Saleh et al. |
| 2003/0185225 A1 * | 10/2003 | Wirth et al. ................... 370/419 |
| 2004/0001449 A1 * | 1/2004 | Rostron et al. ................ 370/282 |
| 2004/0047336 A1 * | 3/2004 | Shabtay et al. ............... 370/351 |
| 2004/0105390 A1 | 6/2004 | Saksio |

(Continued)

OTHER PUBLICATIONS

Office Action History for U.S. Appl. No. 11/398,519 from Oct. 29, 2008 to Feb. 23, 2011.

(Continued)

*Primary Examiner* — Kwang B Yao
*Assistant Examiner* — Kenan Cehic
(74) *Attorney, Agent, or Firm* — Patterson & Sheridan, LLP

(57) ABSTRACT

In one embodiment a method is provided for forwarding traffic through a standby device in the event of an uplink connection failure. The method generally includes forwarding traffic received on a first downlink connection with a dual-homed device to an uplink connection with a network core, detecting a failure on the uplink connection with the network core, and in response to detecting the failure, notifying a standby device of the failure and sending a message to the dual-homed device to trigger the dual-homed device to begin forwarding traffic to the network core via a second downlink connection between the standby device and the dual-homed device.

13 Claims, 6 Drawing Sheets

U.S. PATENT DOCUMENTS

| | | | |
|---|---|---|---|
| 2004/0133693 A1* | 7/2004 | Wils et al. | 709/230 |
| 2005/0063395 A1* | 3/2005 | Smith et al. | 370/399 |
| 2005/0108401 A1* | 5/2005 | Gonda | 709/227 |
| 2005/0111350 A1* | 5/2005 | Kano | 370/216 |
| 2006/0023630 A1* | 2/2006 | Akiyama et al. | 370/235 |
| 2006/0159011 A1* | 7/2006 | Dalal et al. | 370/220 |
| 2006/0227704 A1 | 10/2006 | Nakagawa et al. | |
| 2006/0256712 A1* | 11/2006 | Imajuku et al. | 370/218 |
| 2007/0047578 A1 | 3/2007 | Abe et al. | |
| 2007/0183347 A1* | 8/2007 | Gu et al. | 370/258 |
| 2007/0237085 A1 | 10/2007 | Tirumalai et al. | |
| 2007/0280103 A1* | 12/2007 | Savage et al. | 370/228 |
| 2008/0016402 A1 | 1/2008 | Harel et al. | |
| 2008/0181196 A1* | 7/2008 | Regan et al. | 370/351 |
| 2009/0096592 A1* | 4/2009 | Wu et al. | 340/310.12 |
| 2009/0109998 A1* | 4/2009 | Vinayagam et al. | 370/465 |

OTHER PUBLICATIONS

User. (2001). In Hargrave's Communications Dictionary, Wiley, Retrieved on Aug. 2, 2010 from the Internet: <http://www.credoreference.com/entry/hargravecomms/user>.

User. (2006). In ATIS Telecom Glossary, Alliance for Telecommunications Industry Solutions, Retrieved on Aug. 2, 2010 from the Internet: <http://www.is-works.com/glossary/definition.aspx?id=336>.

Designate. (2007). In the American Heritage® Dictionary of the English Language, Retrieved on Aug. 2, 2010 from the Internet: <http://www.credoreference.com/entry/hmdictenglang/designate>.

* cited by examiner

MULTI-CHASIS ETHERNET LINK AGGREGATION

TECHNICAL FIELD

Embodiments of the present disclosure generally relate to network traffic management.

BACKGROUND

Service providers often seek to maximize their network up-time and service availability by employing link and node redundancy schemes. In the context of carrier Ethernet, a typical topology is to have an access node (for example Digital Subscriber Line Access Multiplexer (DSLAM)) or a customer edge (CE) device "dual-homed" meaning it is attached to two aggregation switches. This topology provides port, link and node level redundancy for the dual-homed device (DHD).

It is often desirable to prevent Layer 2 forwarding loops in a network using some type of mechanism, such as the Spanning-Tree Protocol (STP). However, in some situations, a DHD is either not capable of running STP or the use of STP does not efficiently scale. For example, if a large number of DHDs are connected to the same provider edge (PE) device pair, the use of STP may not scale efficiently. For these situations, it is desirable to implement a redundancy/resiliency mechanism that is not based on STP. Ethernet Link Aggregation (LAG) schemes using a Link Aggregation Control Protocol (LACP) defined in IEEE Standard 802.3-2005 is one such mechanism.

Unfortunately, link aggregation using LACP as defined in IEEE standard 802.3-2005 only works between two back-to-back nodes and is not an option for DHDs connected to a pair of aggregation switches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

OVERVIEW

Figure 1:
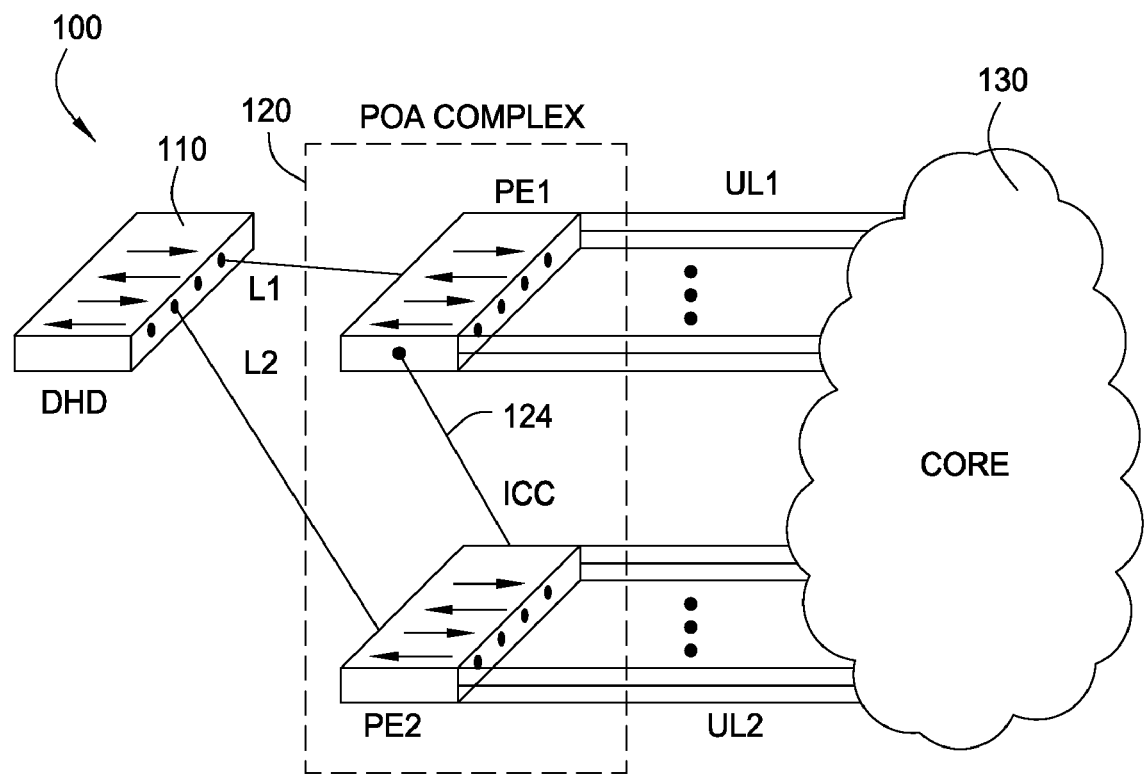
FIG. 1 illustrates an example network topology in accordance with some embodiments of the present disclosure.

In one embodiment a method is provided for forwarding traffic through a standby device in the event of an uplink connection failure. The method generally includes forwarding traffic received on a first downlink connection with a dual-homed device to an uplink connection with a network core, detecting a failure on the uplink connection with the network core, and in response to detecting the failure, notifying a standby device of the failure and sending a message to the dual-homed device to trigger the dual-homed device to begin forwarding traffic to the network core via a second downlink connection with the standby device.

One embodiment provides a network apparatus. The network apparatus generally includes a downlink interface for establishing a downlink connection with a dual-homed device, an uplink interface for establishing an uplink connection with a network core to forward traffic from the dual-homed device to the network core, and logic for detecting a failure on the uplink connection with the network core and, in response, notifying a standby device of the failure and sending a message to the dual-homed device to trigger the dual-homed device to begin forwarding traffic to the network core via a second downlink connection with the standby device.

One embodiment provides a point of attachment complex. The point of attachment complex generally includes a first switch having a downlink interface for establishing a downlink connection with a dual-homed device, an uplink interface for forwarding traffic from the dual-homed device to a network core, and logic for detecting a failure on the uplink connection with the network core and, in response, notifying a second switch of the failure and sending a message to the dual-homed device to trigger the dual-homed device to begin forwarding traffic to the network core via a downlink connection with the second switch and a second switch having a downlink interface for establishing a downlink connection with the dual-homed device, an uplink interface for forwarding traffic from the dual-homed device to the network core, and logic configured to receive notification of the uplink failure from the first switch and, in response, optionally enable the second switch's uplink connection to the core if previously disabled, as well as communicate with the dual-homed device to enable forwarding traffic from the dual-homed device to the network core through the second switch.

One embodiment provides a network apparatus. The network apparatus generally includes means for establishing a downlink connection with a dual-homed device, means for establishing an uplink connection with a network core to forward traffic from the dual-homed device to the network core, and means for detecting a failure on the uplink connection with the network core and, in response, notifying a standby device of the failure and sending a message to the dual-homed device to trigger the dual-homed device to begin forwarding traffic to the network core via a second downlink connection with the standby device.

The present disclosure generally provides techniques for link aggregation that provide for efficient failover to a redundant device in the event of an uplink failure. The techniques may be utilized, for example, in applications where a device is dual homed to a pair of aggregation switches with uplink connections to a network core to provide redundancy.

As used herein, the terms uplink and downlink are relative terms that describe connections between devices, but do not imply any particular physical location of the devices. In particular example embodiments described herein, the term downlink refers to a connection between a dual-homed device and a point of access (POA) device to a network core, such as the Internet. The term uplink, on the other hand, generally refers to a connection between the POA and the network core. The dual-homed device is so named as it may maintain two (dual) downlink connections with two different POA devices (each having an uplink connection to the network core) for redundancy.

By running a modified version of a link aggregation control protocol (LACP) on the aggregation switches, the multi-chassis "complex" of aggregation switches may appear as a single device to the dual-homed device. An inter-chassis control channel (ICC) between the aggregation switches allows for state synchronization between an active aggregation switch and a standby and failover notification if an uplink or downlink failure is detected for the active aggregation switch, while preserving bandwidth.

In some embodiments, the aggregation switches may be housed in a single chassis. Accordingly, the ICC between the aggregation switches may be an intra-chassis control channel allowing for state synchronization between the active aggregation switch and the standby switch and failover notification if an uplink or downlink failure is detected for the active aggregation switch.

As a result of running a modified version of a link aggregation control protocol on the aggregation switches, a link between the DHD and the standby aggregation switch may be kept in a "hot standby" state, allowing for an efficient failover with reduced latency when compared with conventional failover processes that require a redundant link to be brought up. The aggregation switch experiencing the failure may utilize dynamic management of link priority or membership in a link aggregation group (LAG) in a unique manner by decreasing the link priority or removing a link from a LAG member set to trigger a failover process at the DHD.

For example, when two LACP enabled devices negotiate a link, they may exchange LACP data units (LACPDU) containing device setting information. During this negotiation, the DHD may receive LACPDUs from POA1 and POA2 on ports with the same port key and create a link aggregation group (LAG). By setting a POA complex maximum allowable links per group to one, however, a port for a standby POA device may be kept in standby mode (e.g., by assigning a lower port priority value to that port than a port on an active POA device). If an uplink failure is detected on the active device, however, the active device may change its port key or port priority value, causing that port to be removed from the group or go into standby mode, making room in the group for the port on the standby POA. When the DHD becomes aware of this port priority value or port key change, it may automatically failover and establishes communication with the standby device.

In the following, reference is made to embodiments of the disclosure. However, it should be understood that the present disclosure is not limited to specific described embodiments. Instead, any combination of the following features and elements, whether related to different embodiments or not, is contemplated to implement and practice the techniques presented herein. Furthermore, in various embodiments, the disclosure provides numerous advantages over the prior art. However, although particular embodiments may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

An Exemplary Network Architecture

FIG. 1 is a block diagram depicting a network 100, in which embodiments of the present disclosure may be utilized. As illustrated, the network 100 may contain a DHD 110 (for example a DSLAM, CE device, or such device) for sending data traffic to a network (e.g., service provider) core 130 via a point of attachment (POA) complex 120.

For some embodiments, the service provider core 130 may be a Multiprotocol Label Switching (MPLS) network that forwards internet protocol (IP) traffic using labels. These labels may instruct the routers and the switches in the service provider core 130 where to forward packets as they are routed between PE routers en route to DHDs 110 based on pre-established IP routing information. The core network may also employ MPLS pseudowires to transfer Layer 2 frames en route to DHDs.

The POA complex 120 may provide multiple links of a link aggregation group (LAG) terminate on two different PE nodes (i.e., PE1 and PE2). These PE nodes are commonly referred to as Aggregation Switches. Having multiple links of a LAG terminate on different PE nodes provides redundancy, not only across port and link failures, but also across a single PE node failure.

As illustrated, PE1 and PE2 may be connected, via an inter-chassis control channel (ICC) 124. The ICC 124 may be implemented as a data bus or as a logical connection over a packet switched network used to transfer commands between the PE devices, for example, allowing the synchronization of state information, notification of link (uplink and downlink) failures, and the like. The ICC 124 may consume much less bandwidth than an inter-chassis data channel which forwards not only control but also data traffic and is used to provide redundant paths in conventional multi-chassis complexes.

Example Link Aggregation Operations

For some embodiments, the ICC 124 may be utilized to perform operations that allow the PE devices within the complex to implement a modified (enhanced) version of a link aggregation control protocol. For example, while the DHD may implement a standard link aggregation protocol (such as LACP), the PE devices may implement an enhanced version of such a protocol that allows the pair of PE devices to appear as a single device, while still providing redundancy and efficient failover, as described herein.

Figure 2:
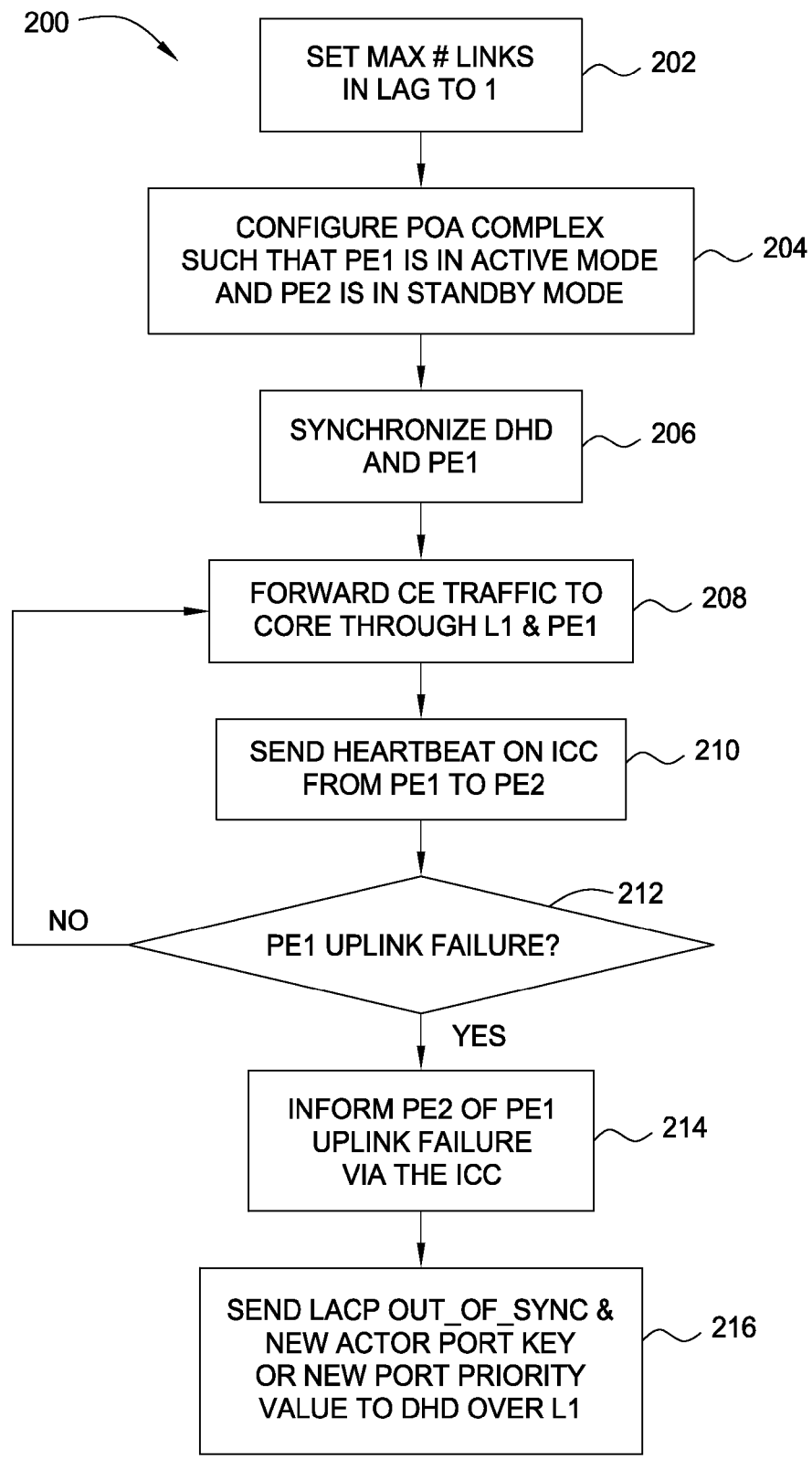
FIG. 2 illustrates a flow diagram of example operations in accordance with some embodiments of the present disclosure.

FIG. 2 illustrates example operations 200 that may be performed to configure and enable efficient failover from an active PE device to a standby PE device, according to one embodiment, for example, in the event that the active PE device becomes isolated from the network core due to an uplink failure. The example operations 200 include configuration operations 202-204 as well as operations 206-216 that may be performed by an active PE device to cause a failover to the standby PE device.

For the following example embodiments, the operations 200 assume that the DHD device implements a standard link aggregation control protocol, such as IEEE standard 802.3-2005 LACP, while the PE devices on the POA complex may be extended such that it runs on two chassis (i.e., PE1 and PE2) while giving the DHD the illusion that it is connected to a single device.

The configuration operations may be performed in a manner that results in one of the PE devices (PE1 in this example) initially serving as an active device used to forward traffic from the DHD to the core, while the other PE device (PE2 in this example) initially acts as a standby device. Such a configuration in which the DHD allows a LAG to have two or more links while the PE nodes limit a LAG to a single link may force one or more of the links from the DHD to the POA complex to enter and maintain a hot/standby operational state, allowing a faster failover than if the redundant link needed to be brought up.

The operations begin, at 202, with the first and second PE nodes being configured such that the maximum number of links in a link aggregation group (LAG) is 1. At 204, the POA complex is configured so that PE1 is in active mode and PE2 is in a standby mode. For example, assuming a higher priority is given to PE1 downlink L1 than PE2 downlink L2, a maximum number of one link per LAG forces PE1 to be used as an active device and PE2 to become a standby device.

For some embodiments, during configuration, the DHD may receive LACPDUs from both POA1 and POA2 over links L1 and L2, respectively, with the same port key identified. In response, the DHD may form a logical link by aggregating these links into a link aggregation group (LAG). From the POA complex, however, by setting the maximum number of links in a group to one, only one of the POA ports may be allowed to join the group. In this manner, the techniques provided herein may utilize LACP dynamic key management or port priority in a unique manner that is different than its conventional use. For example, if an uplink failure is detected on the active device, the active device may change its port key or port priority value on the downlink to the DHD, causing that port to be removed from the group or causing it to go into standby mode, making room in the group (that was limited to one member) for the port on the standby device. In order to prompt a failover to the standby link by changing the port priority value of the active device, the new port priority value assumed by the active device should be lower than the port priority value configured on the standby device. When the DHD becomes aware of this port key or port priority change, it may automatically remove that port from the LAG and establish communication with the standby device as will be described in greater detail below.

At 206, DHD and PE1 synchronize link state information in preparation of forwarding traffic. For example, the DHD and PE1 may exchange a type of control message (generally referred to as IN_SYNC LACP messages), effectively synchronizing the DHD and PE1. Once synchronized, at 208, the DHD begins to forward DHD traffic to the core through link L1 and PE1 uplinks UL1.

The following description makes use of various operating states of links that may be defined by a standard. For example, the IEEE standard 802.3-2005 LACP standard defines COLLECTING-DISTRIBUTING, WAITING, DETACHED, and ATTACHED states that indicate certain types of communication may or may not be possible on a corresponding link.

Figure 3A:
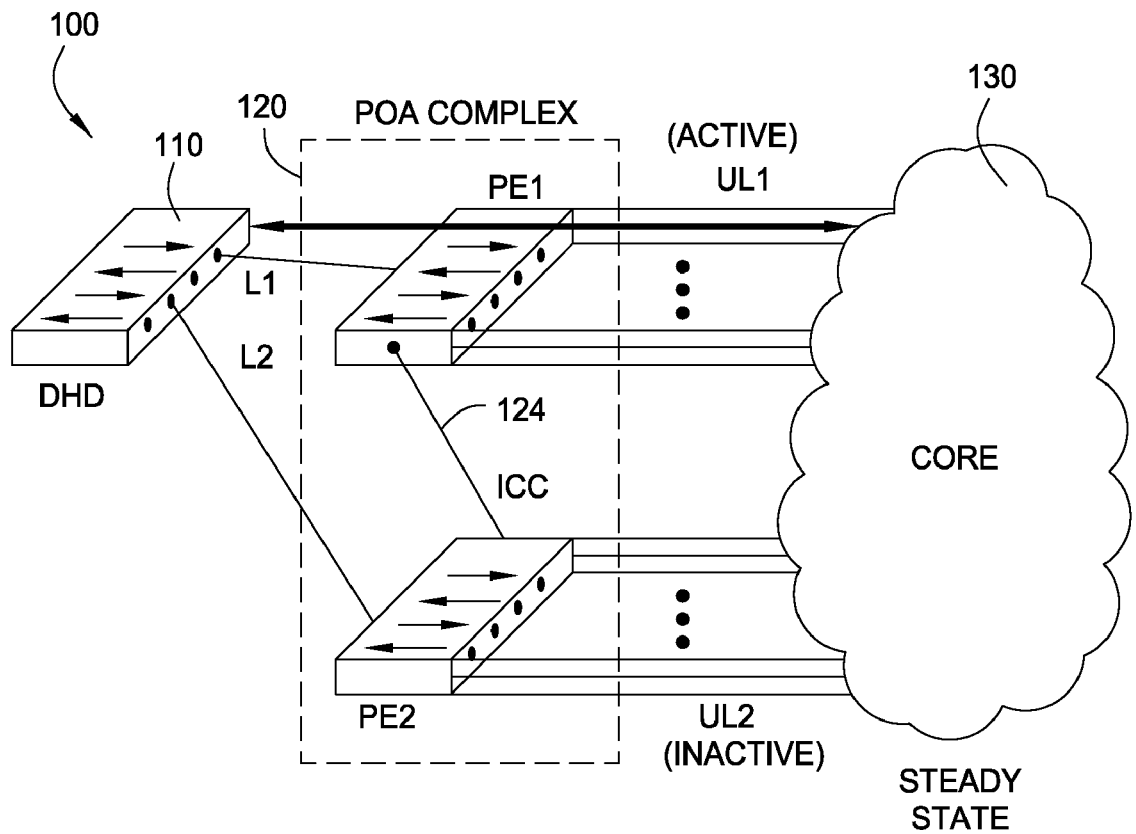
FIGS. 3A-3D illustrate a block diagram of example operations in accordance with some embodiments of the present disclosure.

FIG. 3A illustrates this initial "steady state" operation, with PE1 active and PE2 in standby. As illustrated in state table 300A, from the DHD perspective, link L1 may be in a COLLECTING-DISTRIBUTING state, while L2 is in an ATTACHED State. From the PE device perspective, L1 is also in a COLLECTING-DISTRIBUTING state, however, L2 is in a WAITING state. As illustrated, traffic from the DHD is forwarded through PE1 to the core.

During operation, at 210, a periodic "heartbeat" message may be sent on the ICC from PE1 to PE2. This heartbeat may allow synchronization of state information between PE1 and PE2 and allow for notification of a link failure or detection of PE node failure. State synchronization may also be achieved via an asynchronous event-triggered notification, in addition to or in lieu of a periodic message. As long as no failures are detected (at 212), these "steady-state" operations may be repeated.

Figure 3B:
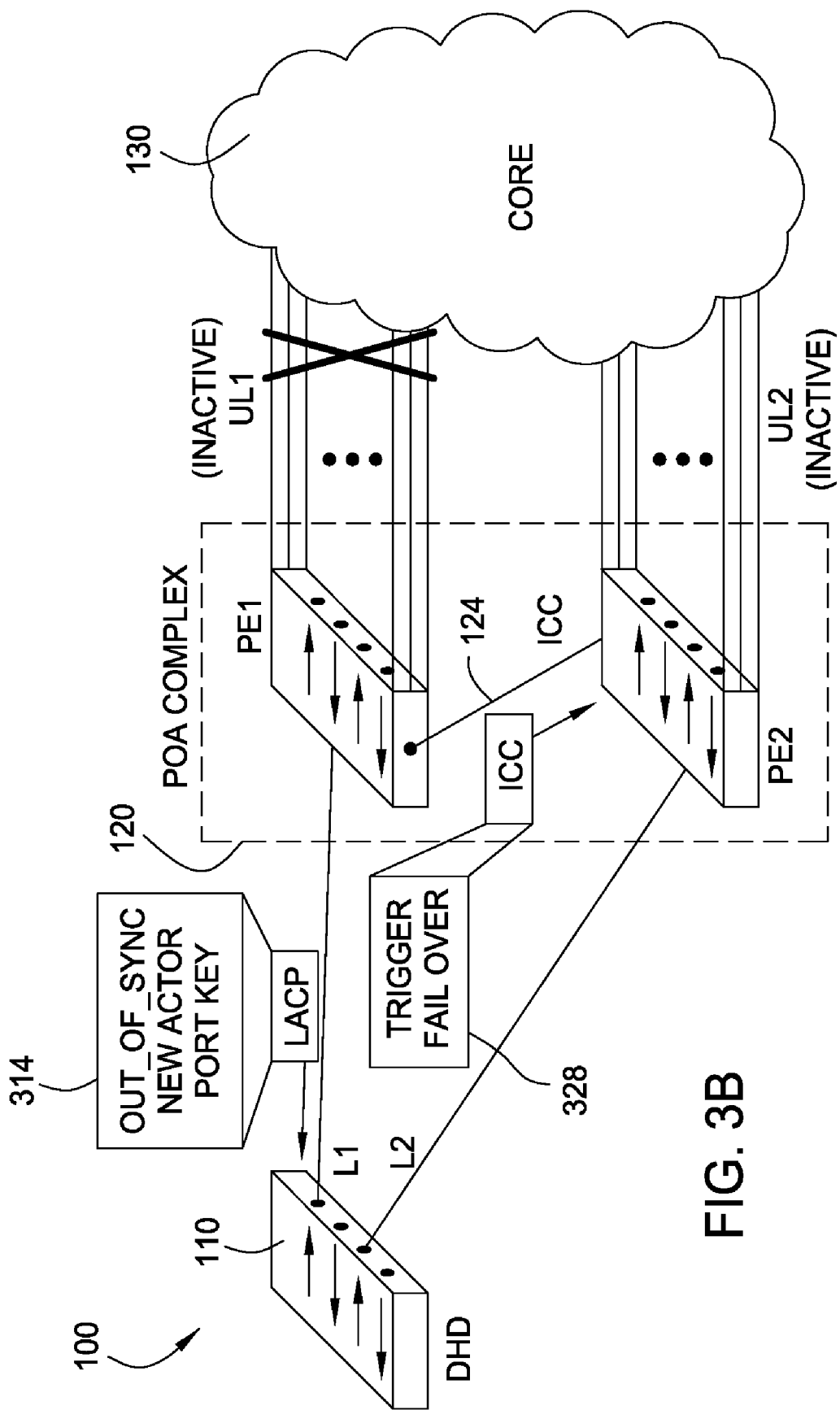

However, if PE1 detects an uplink failure, as illustrated in FIG. 3B, PE1 informs PE2 of the uplink failure, at 214. The notification may take the form of a trigger failover message 328 sent along the ICC. Further, PE1 may dynamically change its actor port key or port priority value in response to an uplink failure. At 216, PE1 may send out a LACP message 314 over L1, transmitting its OUT_OF_SYNC status as well as its new actor port key or port priority value.

In response to receiving the trigger failover message 328, PE2 may activate its uplink to the core, UL2. While shown as sequential steps in the flow diagram of FIG. 2, for some embodiments, the transmission of ICC message 328 and LACP message 314 may happen essentially simultaneously. The dynamic implementation and transmission of a new actor port key or port priority value by PE1 excludes the PE node and corresponding link (i.e., L1) from the LAG or forces L1 into a standby mode. As a result, the DHD discontinues forwarding traffic to the core through L1 and PE1.

Figure 3C:
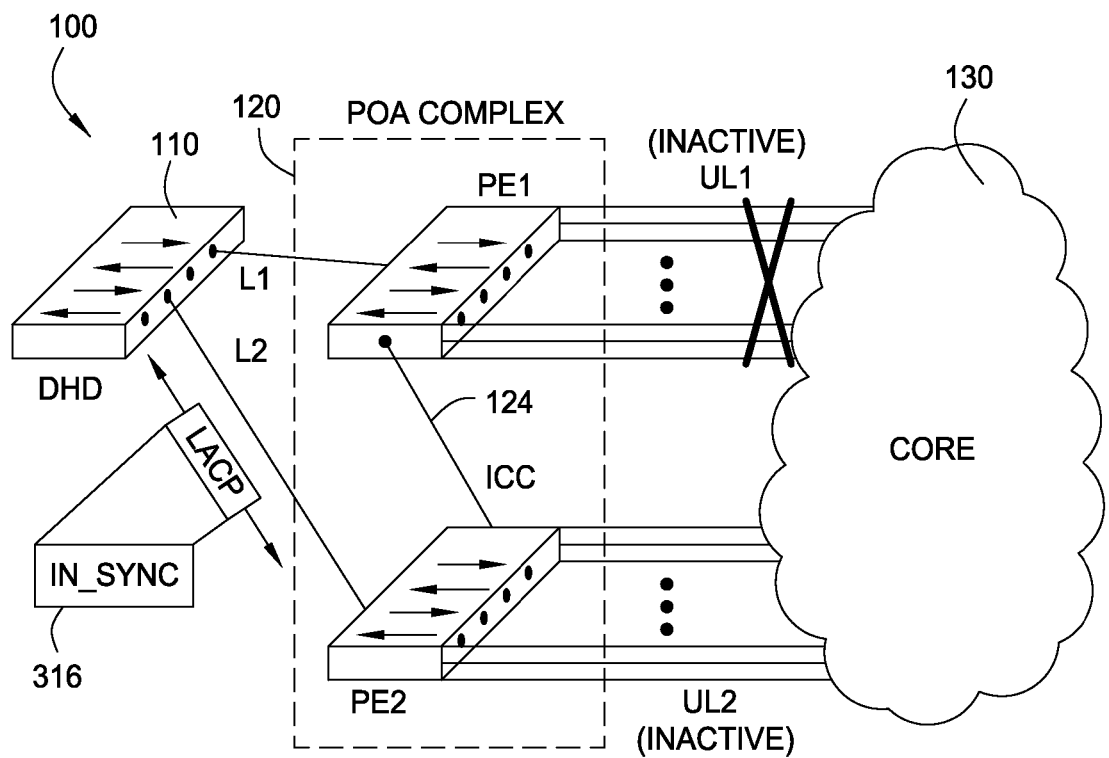

Instead, the DHD may default to using the initially lower priority PE node (i.e., PE2) and corresponding link L2, as it is the highest priority node with the correct actor port key. Then, the DHD and PE2 may exchange IN_SYNC LACP messages 316, effectively synchronizing the DHD and PE2, as illustrated in FIG. 3C. After synchronizing with the DHD, PE2 becomes the active PE node and the DHD begin forwarding DHD traffic to the core through L2, PE2 and UL2.

Figure 3D:
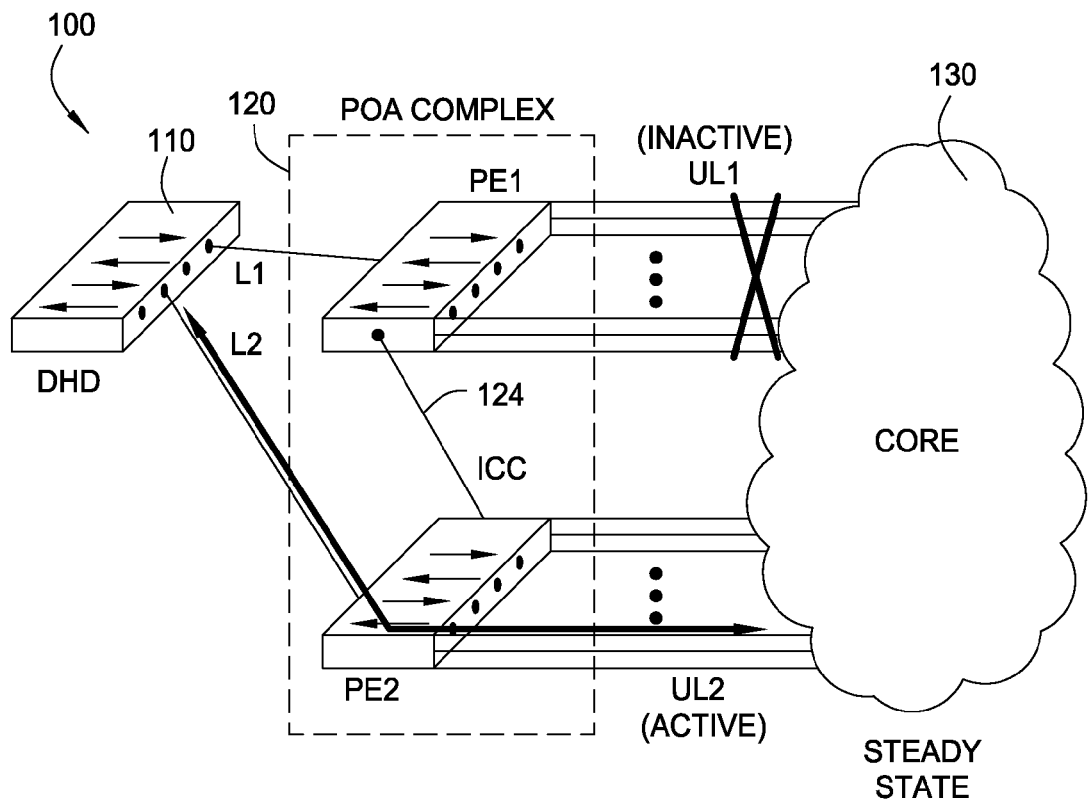

FIG. 3D illustrates the system after a failover, in a second steady state with PE2 as the active node. As illustrated in state table 300D, the DHD, looking at the POA complex 120, may see link L1 in a DETACHED state in which L1 is not selected and OUT_OF_SYNC. While, the DHD may see link L2 in a COLLECTING-DISTRIBUTING state in which L2 is selected and IN_SYNC. From the POA complex 120, looking at the DHD, PE1 may see link L1 in a DETACHED state in which L1 is not selected and OUT_OF_SYNC and PE2 may see link L2 in a COLLECTING-DISTRIBUTING state in which L2 is selected and IN_SYNC.

It should be noted that after the DHD receives LACP message indicating PE1 is OUT_OF_SYNC and has a new actor port key or port priority value, it discontinues forwarding traffic to the core through L1. However, link L1 remains operational at layer 1, connecting the DHD to PE1. Maintaining link L1 operational at layer 1 despite the failure of UL1 may allow a quicker transition from PE2 to PE1, for example, if the failure of UL1 is corrected.

Additionally, if the active device changes the port priority value on L1 such that it is lower than L2, then the DHD, looking at the POA complex 120, may see link L1 in an ATTACHED state in which L1 is selected and IN_SYNC. While, the DHD may see link L2 in a COLLECTING-DISTRIBUTING state in which L2 is selected and IN_SYNC. From the POA complex 120, looking at the DHD, PE1 may see link L1 in a WAITING state in which L1 is in standby mode and OUT_OF_SYNC and PE2 may see link L2 in a COLLECTING-DISTRIBUTING state in which L2 is selected and IN_SYNC.

While a relatively simple example is described above, with a single DHD linked to a single POA complex, the techniques described herein may be utilized in more complex applications. For some embodiments, more than one DHD device may be linked to both multiple PE nodes of a single POA complex. The additional DHD devices may be configured such that during normal steady state operation, one PE node is in an active state, while another is in a standby state.

For various reasons, such as load balancing, one PE node may be in an active mode with respect to one of the attached DHDs and in a standby mode with respect to a different DHD. Further, the techniques provided herein may be utilized for a variety of different network services. For example, the failover techniques may be applied for native Ethernet, Virtual private LAN service (VPLS), and Virtual private wire service VPWS, and combinations of different services.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
configuring a maximum number of links allowed in a link aggregate group (LAG) on each of a network device and a standby network device to one;
configuring a maximum number of links allowed in the link aggregate group (LAG) on a dual-homed device to at least two, wherein the network device provides a first downlink connection with the dual-homed device and the standby network device provides a second downlink connection to the dual-homed device, and wherein the dual-homed device associates the first and second downlinks links with the link aggregate group;
forwarding traffic received by the network device on the first downlink connection with the dual-homed device to an uplink connection with a network core;
detecting a failure on the uplink connection with the network core; and
in response to detecting the failure, notifying the standby device of the failure, through an inter-chassis control channel between the network device and the standby device and sending a message to the dual-homed device triggering the dual-homed device to begin forwarding traffic to the network core via the second downlink connection between the standby device and the dual-homed device, wherein the inter-chassis control channel is physically independent of the uplink connection and the first and second downlink connections, wherein a state synchronization is performed between the network device and the standby device through sending a periodic heartbeat message from the network device to the standby device over the inter-chassis control channel.

2. The method of claim 1, further comprising, maintaining the first downlink connection in an active state, while preventing traffic forwarding on the first downlink connection, after sending the message to the dual-homed device.

3. The method of claim 1, wherein sending the message to the dual-homed device comprises sending an OUT_OF_SYNC message compliant with a link aggregate control protocol (LACP).

4. The method of claim 3, further comprising:
changing at least one of a port key and a port priority value for a port used for the first downlink connection; and
sending a message with the changed port key or port priority value to the dual-homed device.

5. An apparatus having a network device and an standby device, the apparatus comprising:
a downlink interface on the network device for establishing a first downlink connection with a dual-homed device,
a downlink interface on the standby device for establishing a second downlink connection with the dual-homed device, wherein a maximum link aggregate group size on each of the network device and the standby device is set to one, wherein a maximum link aggregate group size on the dual-homed device is set to at least two, and wherein the dual-homed device associates the first and second downlink connections with the link aggregate group;
an uplink interface on each of the network device and the standby device for establishing a respective uplink connection with a network core to forward traffic received from the dual-homed device to the network core; and
logic for detecting a failure on the uplink connection of the network device with the network core and, in response, notifying the standby device of the failure, through a inter-chassis control channel and sending a message to the dual-homed device triggering the dual-homed device to begin forwarding traffic to the network core via the second downlink connection between the standby device and the dual-homed device, wherein the inter-chassis control channel is physically independent of the uplink connection and the downlink connection, wherein a state synchronization is performed between the network device and the standby device through sending a periodic heartbeat message from the network device to the standby device over the inter-chassis control channel.

6. The apparatus of claim 5, wherein the first downlink connection remains in an active state, with traffic forwarding prevented, after sending the message to the dual-homed device.

7. The apparatus of claim 5, wherein the message sent to the dual-homed device comprises an OUT_OF_SYNC message compliant with a link aggregate control protocol (LACP).

8. The apparatus of claim 7, further comprising logic for changing a port key or port priority value of a port used for the first downlink connection and sending the changed port key or port priority value to the dual-homed device, to trigger the dual-homed device to begin forwarding traffic to the network core via a second downlink connection with the standby device.

9. An apparatus, comprising:
a first switch connected to a second switch through an inter-chassis control channel, the first switch comprising:
a downlink interface for establishing a downlink connection with a dual-homed device, an uplink interface for forwarding traffic received from the dual-homed device on the downlink interface to a network core via an uplink connection, and
a first logic, wherein the first logic is configured to detect a uplink failure on the uplink connection with the network core, only notify the second switch of the uplink failure through the inter-chassis control channel, on the uplink connection, and sending a message to the dual-homed device to trigger the dual-homed device to begin forwarding traffic to the network core via a downlink connection between the second switch and the dual-homed device,
wherein the second switch having a downlink interface for establishing a downlink connection with the dual-homed device, an uplink interface for forwarding traffic from the dual-homed device to the network core, and a second logic, wherein the second logic is configured to receive notification, through the inter-chassis control channel, of the uplink failure from the first switch and, in response to receiving notification of the uplink failure from the first switch, enable an uplink connection between the second switch and the network core if previously disabled,
wherein the inter-chassis control channel is physically independent of the uplink connection and the downlink connection,
wherein a state synchronization is performed between the first switch and the second switch through sending a periodic heartbeat message from the first switch to the second switch over the inter-chassis control channel, and
wherein the first and second switches are configured such that a maximum number of links in a link aggregate group (LAG) is one and the dual-homed device is configured such that a maximum number of links in the link aggregate group (LAG) is at least two.

10. The apparatus of claim 9, wherein the downlink connection of the first switch remains in an active state, with traffic forwarding prevented, after the sending of the message to the dual-homed device.

11. The apparatus of claim 9, wherein the message sent to the dual-homed device by the first switch comprises an OUT_OF_SYNC message compliant with a link aggregate control protocol (LACP).

12. An apparatus having a network device and an standby device, the apparatus comprising:
   means for establishing a downlink connection between the network device and with a dual-homed device;
   means for establishing a downlink connection between the standby device and a dual-homed device, wherein a maximum link aggregate group size on each of the network device and the standby device is set to one, and wherein a maximum link aggregate group size on the dual-homed device is set to at least two, and wherein the dual-homed device associates the first and second downlink connections with the link aggregate group;
   means for establishing a respective uplink connection on each of the network device and the standby device with a network core to forward traffic received from the dual-homed device to the network core; and
   means for detecting a failure on the uplink connection of the network device with the network core and, in response, notifying the standby device of the failure, through a inter-chassis control channel and sending a message to the dual-homed device triggering the dual-homed device to begin forwarding traffic to the network core via the second downlink connection between the dual-homed device and the standby device, wherein the inter-chassis control channel is physically independent of the uplink connection and the downlink connection, wherein a state synchronization is performed between the network device and the standby device through sending a periodic heartbeat message from the network device to the standby device over the inter-chassis control channel.

13. The apparatus of claim 12, wherein:
   the message sent to the dual-homed device comprises an OUT_OF_SYNC message compliant with a link aggregate control protocol (LACP); and
   the apparatus further comprises means for changing a port key or port priority value of a port used for the downlink connection and for sending the changed port key or port priority value to the dual-homed device in a message compliant with the LACP.

* * * * *